US010172205B2

(12) United States Patent
Huang et al.

(10) Patent No.: US 10,172,205 B2
(45) Date of Patent: Jan. 1, 2019

(54) DIMMING MODULE, DIMMING METHOD AND LIGHTING DEVICE

(71) Applicant: Lextar Electronics Corporation, Hsinchu (TW)

(72) Inventors: Jhao-Cyuan Huang, New Taipei (TW); Chien-Nan Yeh, Kaohsiung (TW); Chun-Jong Chang, Hsinchu County (TW); Ching-Piao Chen, Hsinchu County (TW); Po-Shen Chen, Hsinchu (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/591,088

(22) Filed: May 9, 2017

(65) Prior Publication Data
US 2017/0339763 A1    Nov. 23, 2017

(30) Foreign Application Priority Data
May 18, 2016    (TW) .............................. 105115361 A

(51) Int. Cl.
*H05B 37/00*      (2006.01)
*H05B 33/08*      (2006.01)
(Continued)

(52) U.S. Cl.
CPC .......... *H05B 33/0851* (2013.01); *F21K 9/238* (2016.08); *F21V 23/005* (2013.01); *H05B 33/0812* (2013.01); *H05B 33/0815* (2013.01); *F21K 9/232* (2016.08); *F21S 8/02* (2013.01); *F21S 8/04* (2013.01); *F21Y 2115/10* (2016.08)

(58) Field of Classification Search
CPC .... H05B 41/34; H05B 33/0803; H05B 39/09; H05B 41/28; H05B 33/0809; H05B 41/295; H05B 41/2827; H05B 41/3925; H05B 33/0815; H05B 33/0818; H05B 41/2828;
(Continued)

(56) References Cited
U.S. PATENT DOCUMENTS

2011/0074302 A1*  3/2011  Drapeer et al. ........ H05B 41/36
2011/0163684 A1*  7/2011  Il et al. .................. H05B 37/02
2013/0127371 A1*  5/2013  Sarig et al. ............ H05B 37/02

FOREIGN PATENT DOCUMENTS

CN    102036458 A    4/2011
CN    102244965 A    11/2011
(Continued)

Primary Examiner — Minh D A
(74) Attorney, Agent, or Firm — CKC & Partners Co., Ltd.

(57) ABSTRACT

A dimming module includes a triggering circuit, a control signal generating circuit, a voltage converting circuit, and a linear driving circuit. The triggering circuit is configured to control a trigger delay angle of an AC input voltage according to a dimming command, in order to output a first voltage signal correspondingly. The control signal generating circuit is configured to output a control voltage according to the first voltage signal. The voltage converting circuit is configured to output a DC operating voltage having an operating level according to the first voltage signal, and output the DC operating voltage to a lighting module, in which the lighting module includes a light-emitting diode. The linear driving circuit is configured to drive the lighting module according to the control voltage.

18 Claims, 9 Drawing Sheets

(51) Int. Cl.
  *F21K 9/238*   (2016.01)
  *F21V 23/00*   (2015.01)
  *F21S 8/02*    (2006.01)
  *F21S 8/04*    (2006.01)
  *F21K 9/232*   (2016.01)
  *F21Y 115/10*  (2016.01)

(58) Field of Classification Search
  CPC ............ H05B 41/3921; H05B 41/3927; Y02B 20/202
  USPC ....................................................... 315/291
  See application file for complete search history.

(56) References Cited

FOREIGN PATENT DOCUMENTS

| | | |
|---|---|---|
| CN | 105530740 A | 4/2016 |
| TW | 201110821 A1 | 3/2011 |
| TW | 201125423 A1 | 7/2011 |
| TW | 201526711 A | 7/2015 |

* cited by examiner

DIMMING MODULE, DIMMING METHOD AND LIGHTING DEVICE

RELATED APPLICATIONS

This application claims priority to Taiwan Application Serial Number 105115361, filed May 18, 2016, which is herein incorporated by reference.

BACKGROUND

Technical Field

The present disclosure relates to a dimming module, a dimming method and a lighting device, and more particularly, to a dimming module, a dimming method and a lighting device involving the use of light-emitting diodes.

Description of Related Art

In recent times, due to the advantages of light-emitting diodes (LEDs), such as high efficiency and the ability to save energy, LEDs have replaced traditional lighting sources in many applications and have become an important area of research.

However, problems such as control instability and undesired flickering occur when traditional phase-cut dimmers are used to provide dimming control of LEDs. Accordingly, ways in which to simplify the brightness adjustment for lighting devices and to improve the stability of dimming control are important research issues and urgent objects in the relevant field.

SUMMARY

To solve the problem stated above, one aspect of the present disclosure is a dimming module. The dimming module includes a triggering circuit, a control signal generating circuit, a voltage converting circuit, and a linear driving circuit. The triggering circuit is configured to control a trigger delay angle of an ac input voltage according to a dimming command, so as to output a first voltage signal correspondingly. The control signal generating circuit is configured to output a control voltage according to the first voltage signal. The voltage converting circuit is configured to output a dc operating voltage having an operating level according to the first voltage signal, and output the dc operating voltage to a lighting module, in which the lighting module includes a light-emitting diode. The linear driving circuit is configured to drive the lighting module according to the control voltage.

Another aspect of the present disclosure is a dimming method. The dimming method includes receiving a dimming command by a triggering circuit; controlling a trigger delay angle of an ac input voltage according to the dimming command by the triggering circuit, so as to output a first voltage signal correspondingly; rectifying the first voltage signal by a rectifying circuit, so as to output a second voltage signal; receiving the second voltage signal and outputting a control voltage according to the second voltage signal by a control signal generating circuit; converting the second voltage signal to a dc operating voltage having an operating level, and outputting the dc operating voltage to a lighting module by a voltage converting circuit, wherein the lighting module comprises a light-emitting diode; and driving the lighting module according to the control voltage by a linear driving circuit.

Yet another aspect of the present disclosure is a lighting device. The lighting device includes a substrate, a lighting module, a voltage converting circuit, and a linear driving circuit. The lighting module includes a light-emitting diode located on the substrate. The voltage converting circuit is located on the substrate and configured to output a dc operating voltage having an operating level to the lighting module. The linear driving circuit is located on the substrate and configured to drive the lighting module according to a control voltage, so as to adjust a driving current flowing through the lighting module.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
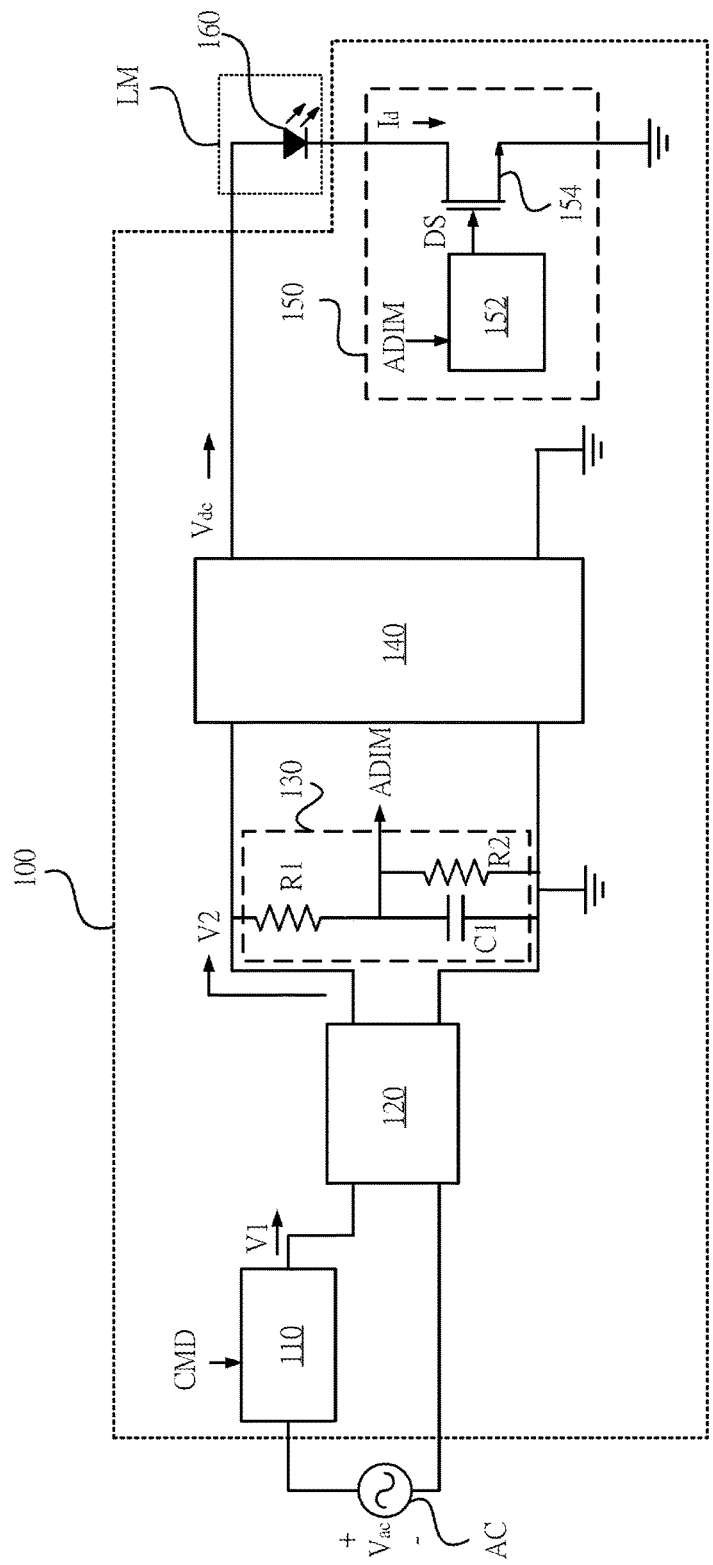
FIG. 1 is a diagram illustrating a lighting device according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a lighting device according to some embodiments of the present disclosure. As shown in FIG. 1, the lighting device includes a dimming module 100 and a lighting module LM. The dimming module 100 is configured to adjust a driving current $I_d$ flowing through the lighting module LM, so as to change the brightness of the lighting module LM. In some embodiments, the dimming module 100 includes a triggering circuit 110, a rectifying circuit 120, a control signal generating circuit 130, a voltage converting circuit 140, and a linear driving circuit 150, and the lighting module LM includes a light-emitting diode 160.

As shown in FIG. 1, in some embodiments, the triggering circuit 110 is electrically coupled to an ac power source AC and is configured to receive an ac input voltage $V_{ac}$ from the ac power source AC, and control the trigger delay angle of the ac input voltage $V_{ac}$ according to a dimming command CMD received externally, so as to output a voltage signal V1 correspondingly. Specifically, the triggering circuit 110 may include a phase-cut dimmer, which is implemented by switching elements such as Triodes for Alternating Current (TRIAC). The phase-cut dimmer is configured to cut off a part of the ac input voltage $V_{ac}$ by a trigger delay, in order to output the voltage signal V1 correspondingly, but the present disclosure is not limited thereto. One skilled in the art may choose other electronic elements to realize the triggering circuit 110 in various embodiments of the present disclosure.

Specifically, in some embodiments, the dimming command CMD may be a remote signal output from a remote control. In some other embodiments, the dimming command CMD may be a wall-control signal output from a wall controller located on the wall. Regardless of whether the dimming command CMD is a remote signal or a wall-control signal, it may be received by a corresponding signal receiving unit and transmitted to the triggering circuit 110 for subsequent dimming operations performed by the dimming module 100.

In some embodiments, the rectifying circuit 120 is electrically coupled to the triggering circuit 110. The rectifying circuit 120 receives the voltage signal V1 from the triggering circuit 110 and performs rectification with respect to the voltage signal V1, thereby converting the voltage signal V1 to the voltage signal V2. The rectifying circuit 120 then outputs the voltage signal V2.

The rectifying circuit 120 may be implemented, for example, by a bridge rectifier that includes multiple diodes. It is noted that the rectifying circuit 120 may be realized in various ways and the rectifying circuit 120 in the present disclosure is not limited to a bridge rectifier.

In some embodiments, the control signal generating circuit 130 is electrically coupled to the rectifying circuit 120, and configured to receive the voltage signal V2 output by the rectifying circuit 120 and in turn output a control voltage ADIM according to the voltage signal V2. Alternatively stated, since the voltage signal V2 is obtained by performing rectification of the voltage signal V1, the control signal generating circuit 130 outputs the control voltage ADIM according to the voltage signal V1. In some embodiments, the control voltage ADIM may be used as an analog dimming signal. For example, the control voltage ADIM may be an analog dimming signal having an amplitude from about 1 volt to about 10 volts.

As shown in FIG. 1, specifically, in some embodiments, the control signal generating circuit 130 includes resistors R1 and R2, and a capacitor C1. A first terminal of the resistor R1 is configured to receive the voltage signal V2. A first terminal of the resistor R2 is electrically coupled to a second terminal of the resistor R1, and a second terminal of the resistor R2 is electrically coupled to a ground terminal. A first terminal of the capacitor C1 is electrically coupled to the first terminal of the resistor R2, and a second terminal of the capacitor C1 is electrically coupled to the second terminal of the resistor R2. Alternatively stated, the capacitor C1 and the resistor R2 are electrically coupled to each other in parallel, and then coupled to the resistor R1 in series to form the control signal generating circuit 130. Thus, by a filtering circuit involving cooperative operation among the resistors R1, R2, and the capacitor C1, the control signal generating circuit 130 may output the control voltage ADIM from the first terminal of the resistor R2.

Therefore, when the dimming command CMD controls the trigger delay angle of the ac input voltage $V_{ac}$ with a large first angle (e.g., about 90 degrees), the voltage signal V1 output by the triggering circuit 110 has a long cut-off time with a zero voltage level, and the voltage signal V2 has a lower average voltage value in a complete cycle after the voltage signal V1 is rectified by the rectifying circuit 120. Thus, after the ac component of the voltage signal V2 is filtered by the capacitor C1, the control voltage ADIM output by the control signal generating circuit 130 has a lower dc level. On the other hand, when the dimming command CMD controls the trigger delay angle of the ac input voltage $V_{ac}$ with a small first angle (e.g., about 30 degrees), the voltage signal V1 output by the triggering circuit 110 has a shorter cut-off time with a zero voltage level, and the voltage signal V2 has a higher average voltage value in a complete cycle after the voltage signal V1 is rectified by the rectifying circuit 120. Thus, after the ac component of the voltage signal V2 is filtered by the capacitor C1, the control voltage ADIM output by the control signal generating circuit 130 has a higher dc level.

Alternatively stated, the control voltage ADIM is at a first level when the trigger delay angle is at a first angle, and the control voltage ADIM is at a second level when the trigger delay angle is at a second angle. When the first angle is larger than the second angle, the first level is smaller than the second level. Thus, the dimming module 100 may control the driving current $I_d$ by controlling the level of the control voltage ADIM in response to the external dimming command CMD received by the triggering circuit 140. The detailed control method of the driving current $I_d$ will be explained in the following paragraphs together with the related circuits.

As shown in FIG. 1, in some embodiments, the voltage converting circuit 140, like the control signal generating circuit 130, is also electrically coupled to the rectifying circuit 120 and configured to receive the voltage signal V2 output by the rectifying circuit 120. The voltage converting circuit 140 may convert the voltage signal V2 to a dc operating voltage $V_{dc}$, and output the dc operating voltage $V_{dc}$ to the lighting module LM. Specifically, the dc operating voltage $V_{dc}$ has an operating level corresponding to the lighting module LM, such that the lighting module LM may be operated in a proper voltage range. Since the voltage signal V2 is obtained by rectifying the voltage signal V1, the voltage converting circuit 140 outputs the dc operating voltage $V_{dc}$ according to the voltage signal V1. In various embodiments, the voltage converting circuit 140 may be realized by various switching power supplies, in which the detailed circuit structure will be explained in the following paragraphs together with the figures.

Specifically, when the triggering circuit 110 changes the trigger delay angle according to the dimming command CMD, the waveform of the voltage signal V1 and the voltage signal V2 are changed accordingly. By the corresponding operation of the voltage converting circuit 140, even if the amplitude and the phase of the inputted voltage signal V2 are changed, the dc operating voltage $V_{dc}$ output by the voltage converting circuit 140 may still be maintained at the same operating level.

Therefore, when a user performs the dimming procedure, the voltage level of the dc operating voltage $V_{dc}$ received by the lighting module LM does not vary with the changes of the control voltage ADIM or of the voltage signals V1 and V2, and thus the flickering issue of the light source is avoided.

In some embodiments, the lighting module LM may include at least one light-emitting diode 160. A first terminal (e.g., the positive terminal) of the light-emitting diode 160 is electrically coupled to the output terminal of the voltage converting circuit 140 to receive the dc operating voltage Vdc, and a second terminal (e.g., the negative terminal) of the light-emitting diode 160 is electrically coupled to the linear driving circuit 150.

Specifically, the linear driving circuit 150 may receive the control voltage ADIM described in the above paragraphs, and correspondingly drive the light-emitting diode 160 in the lighting module LM according to the control voltage ADIM, so as to adjust the driving current $I_d$ flowing through the light-emitting diode 160, and accordingly achieve the dimming function of the dimming module 100. Specifically, when the voltage level of the control voltage ADIM rises, the linear driving circuit 150 may increase the driving current $I_d$ in a complete cycle, in order to increase the brightness of the lighting module LM. On the other hand, when the voltage level of the control voltage ADIM falls, the linear driving circuit 150 may reduce the driving current $I_d$ in a complete cycle, in order to reduce the brightness of the lighting module LM.

In some embodiments, the linear driving circuit 150 may include, for example, a processing unit 152 and a driving unit 154. An input terminal of the processing unit 152 is configured to receive the control voltage ADIM. The processing unit 152 outputs the driving signal DS to the driving unit 154 according to the control voltage ADIM. Accordingly, the driving unit 154 may drive the lighting module LM according to the driving signal DS. Thus, the processing unit 152 may control the driving unit 154 via the driving signal DS, in order to adjust the driving current $I_d$ flowing through the lighting module LM.

As shown in FIG. 1, in some embodiments, the driving unit 154 may include a driving switch. A first terminal of the driving switch is electrically coupled to the lighting module LM, a second terminal of the driving switch is electrically coupled to a ground terminal, and a control terminal of the driving switch is configured to receive the driving signal DS. The driving signal DS may be a pulse width modulation (PWM) signal. Accordingly, the processing unit 152 may control the driving switch to be on or off selectively by adjusting the duty cycle of the driving signal DS, and adjust the amplitude of the driving current $I_d$.

It is noted that, in an actual implementation, the processing unit 152 may be a linear integrated circuit and may be realized by a microcontroller unit (MCU), or by be realized in various ways such as by a digital signal processor (DSP), a field-programmable gate array (FPGA), etc. However, the present disclosure is not limited thereto.

Therefore, by the triggering circuit 110, the rectifying circuit 120, the control signal generating circuit 130, the voltage converting circuit 140, and the linear driving circuit 150 in the dimming module, the user may adjust the brightness of the lighting module LM with the external dimming command CMD.

Since the dc operating voltage $V_{dc}$ is maintained at the same voltage level during the dimming process, the shimmer of the lighting module LM is avoided, and the percent flicker of the lighting device is reduced. In some embodiments, the power factor of the dimming module 100 may be improved by the switching power supply in the voltage converting circuit 140, and thus avoid waste due to the reactive power in the overall system.

Figure 2A:
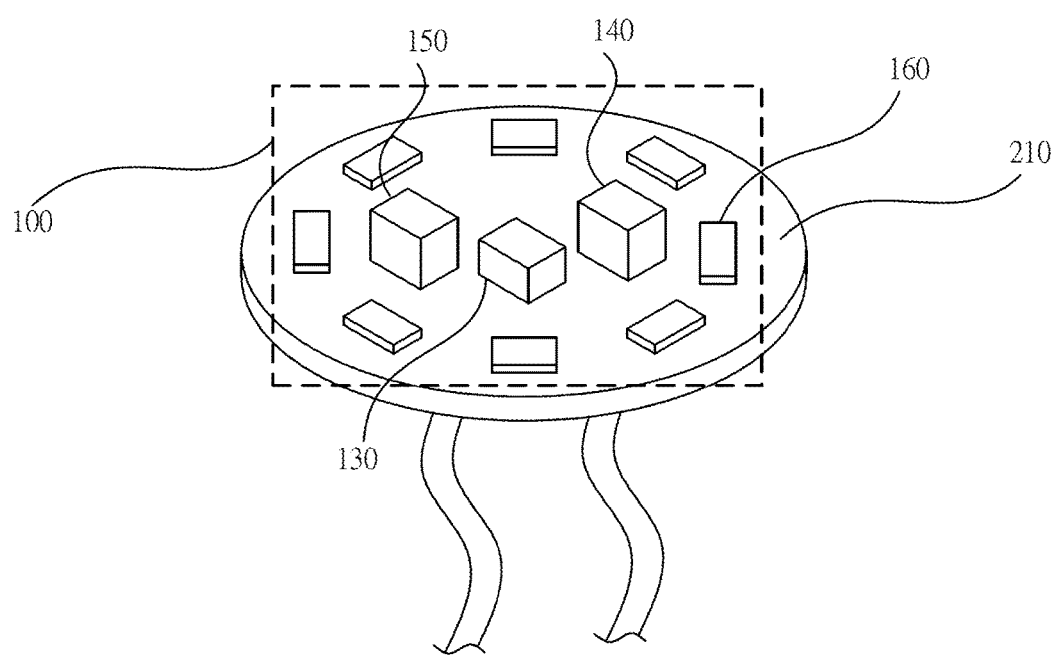
FIG. 2A is a diagram illustrating the lighting device according to some embodiments of the present disclosure.

Reference is made to FIG. 2A. FIG. 2A is a diagram illustrating the lighting device 200a according to some embodiments of the present disclosure. As shown in FIG. 2A, in the lighting device 200a, the light-emitting diode 160 in the lighting module LM, and the circuits and the electronic elements in the dimming module 100, such as the control signal generating circuit 130, the voltage converting circuit 140, and the linear driving circuit 150, etc., are located on a substrate 210 of the lighting device 200a.

Therefore, since the voltage converting circuit 140 is integrated with the light-emitting diode 160, the control signal generating circuit 130, and the linear driving circuit 150 on the substrate 210 to achieve the on-board integration of the power supply, the driving chip and the light source, and further since no additional switching power supply is required in the lamp to supply power, the amount of space used in the lamp is reduced. In addition, since the voltage converting circuit 140 has a higher power conversion efficiency compared to the traditional driving circuit, the amount of waste heat that is generated is reduced, and a low-cost base material may be chosen for the substrate 210 while still maintaining a good heat dissipation capability. For example, in some embodiments, the substrate 210 may be an FR-4 level glass-reinforced epoxy laminate sheet.

Figure 2B:
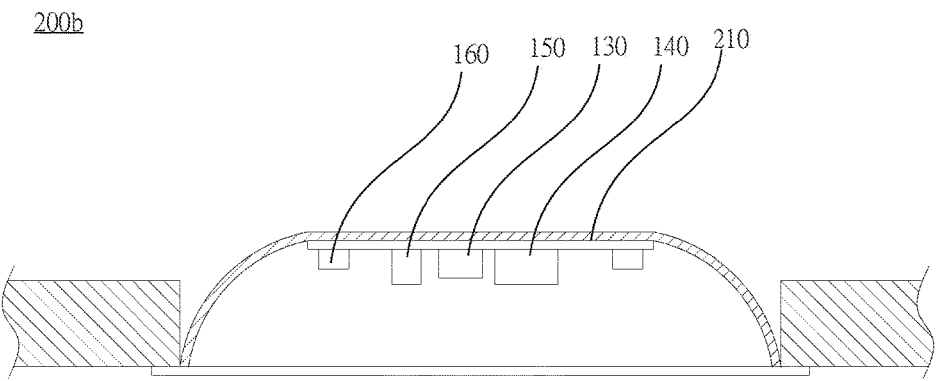
FIGS. 2B, 2C and 2D are diagrams illustrating the lighting device according to some embodiments of the present disclosure.
Figure 2C:
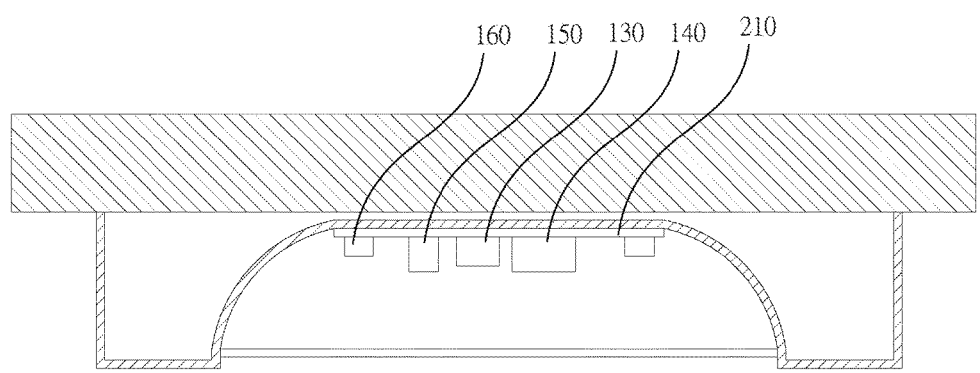
Figure 2D:
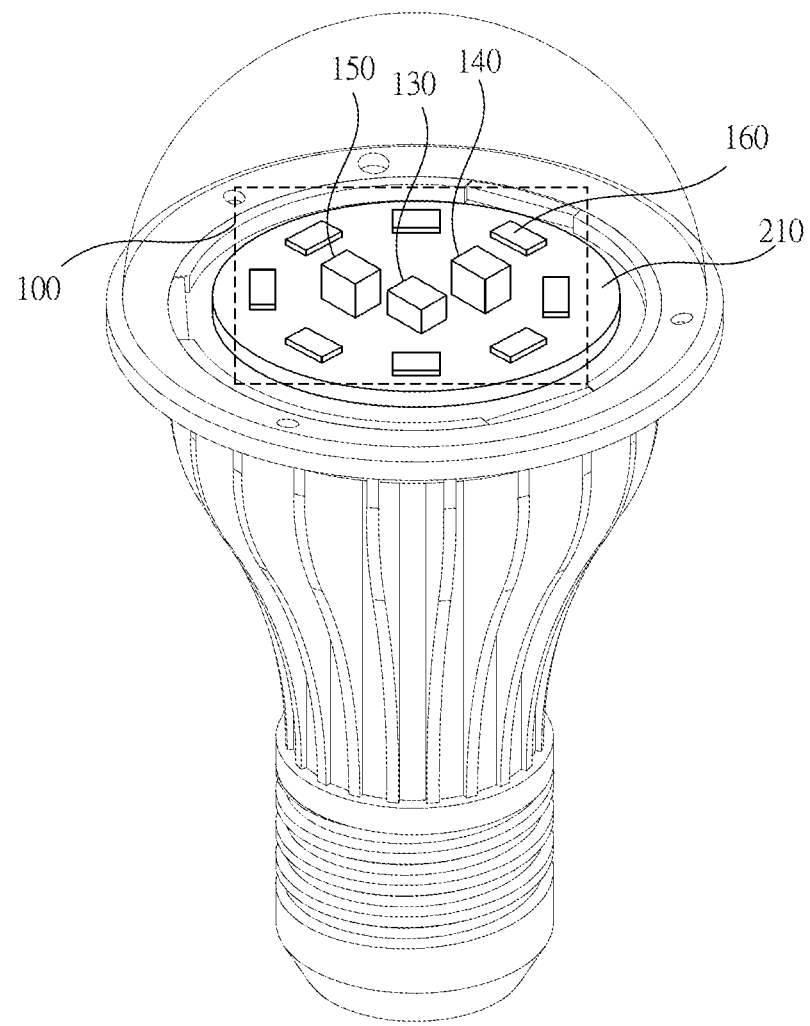

Reference is made to FIGS. 2B, 2C and 2D. FIGS. 2B, 2C and 2D are diagrams illustrating the lighting device 200b, 200c, and 200d according to some embodiments of the present disclosure. As shown in FIGS. 2B, 2C and 2D, the lighting device 200a illustrated in FIG. 2A may be applied in various lamp applications based on actual needs. For example, as illustrated in FIG. 2B, the lighting device 200b may be a lighting application with a ceiling lighting structure. As illustrated in FIG. 2C, the lighting device 200c may be a lighting application with a recessed/downward lighting structure. As illustrated in FIG. 2D, the lighting device 200d may be a lighting application with an LED lightbulb structure. It is noted that the dimming module 100 may also be applied in lamp modules with various other forms, and the embodiments mentioned above are merely examples and not meant to limit the present disclosure.

Figure 3A:
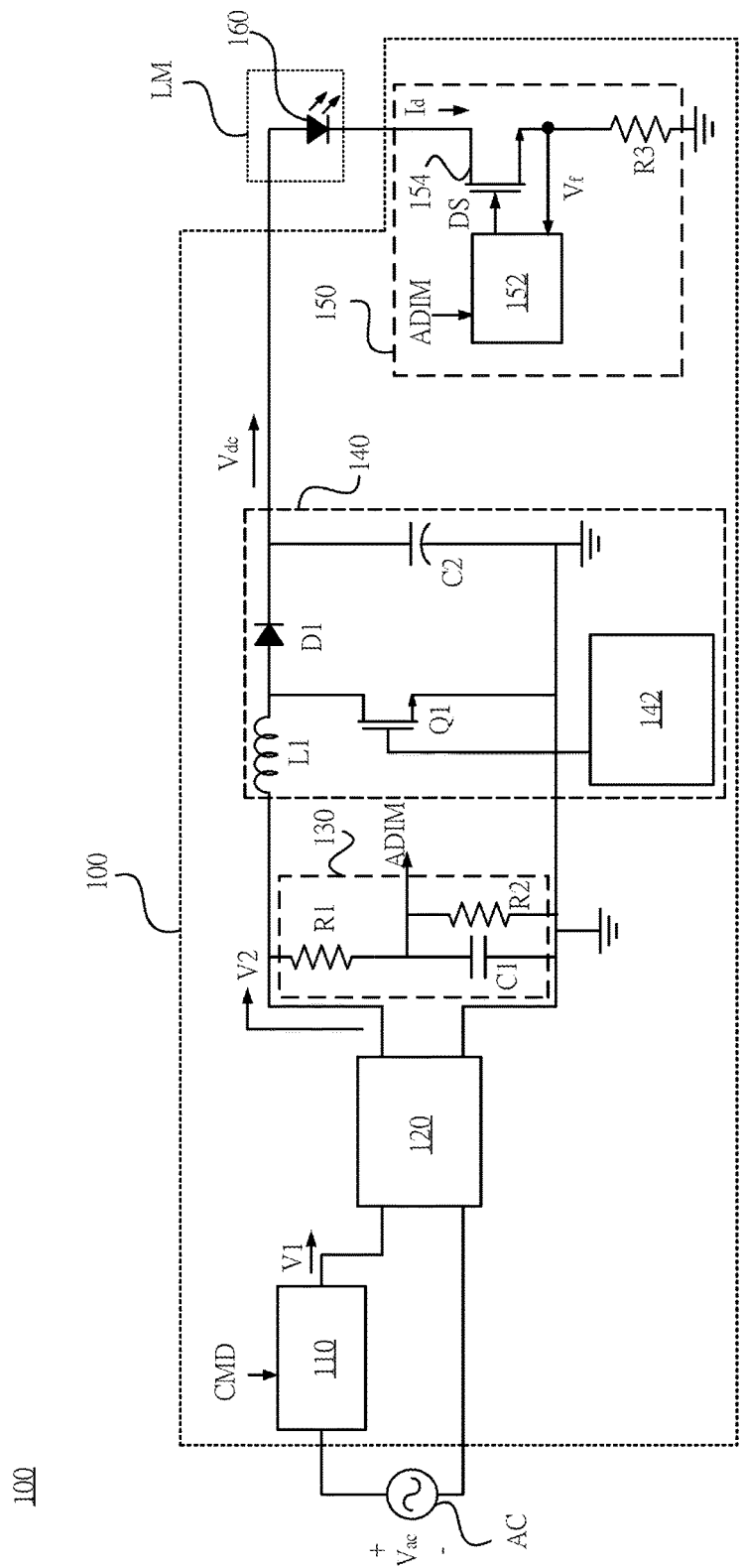
FIG. 3A is a diagram illustrating the lighting device according to some embodiments of the present disclosure.

Reference is made to FIG. 3A. FIG. 3A is a diagram illustrating the lighting device according to some embodiments of the present disclosure. With respect to the embodiments of FIG. 1, like elements in FIG. 3A are designated with the same reference numbers for ease of understanding.

As illustrated in FIG. 3A, in some embodiments, the voltage converting circuit 140 includes a boost converter. Specifically, in the present embodiment, the voltage converting circuit 140 includes an inductor L1, a switch Q1, a diode D1, a capacitor C2 and a driving unit 142.

A first terminal of the inductor L1 is electrically coupled to the rectifying circuit 120 and configured to receive the voltage signal V2. A second terminal of the inductor L1 is electrically coupled to a first terminal of the switch Q1 and the anode of the diode D1. A second terminal of the switch Q1 is electrically coupled to the ground terminal, and a control terminal of the switch Q1 is electrically coupled to the driving unit 142. The cathode of the diode D1 is electrically coupled to the output terminal of the voltage converting circuit 140 and a first terminal of the capacitor C2, and configured to output the dc operating voltage Vdc. A second terminal of the capacitor C2 is electrically coupled to the ground terminal.

Therefore, the driving unit 142 may output the corresponding driving signal DS to selectively turn on or turn off the switch Q1. When the switch Q1 is on, the diode D1 operates in the reverse bias mode, the electric charge stored in the capacitor C2 supplies the dc operating voltage $V_{dc}$ and the driving current $I_d$ required by the lighting module LM. When the switch Q1 is off, the energy stored in the inductor L1 supplies the dc operating voltage $V_{dc}$ and the driving current $I_d$ required by the lighting module LM through the diode D1 operating in the forward bias mode. Thus, by proper control of the driving unit 142, the voltage converting circuit 140 may keep outputting the dc operating voltage $V_{dc}$ in a stable manner when the input voltage signal V2 varies.

It is noted that the voltage converting circuit 140 may also be implemented by various switching power supplies such as a buck-boost converter, and the embodiments mentioned above are merely examples and not meant to limit the present disclosure.

In addition, in some embodiments, the linear driving circuit 150 further includes a resistor R3. In some embodiments, a first terminal of the resistor R3 is electrically coupled to the second terminal of the driving unit 154, and the second terminal of the resistor R3 is electrically coupled to the ground terminal. The processing unit 152 may receive a feedback voltage signal $V_f$ from the first terminal of the resistor R3, and determine the amplitude of the driving current $I_d$ according to the feedback voltage signal $V_f$, so as to adjust the duty cycle of the driving signal DS according to the control voltage ADIM, until the amplitude of the driving current $I_d$ is equal to the target value.

Figure 3B:
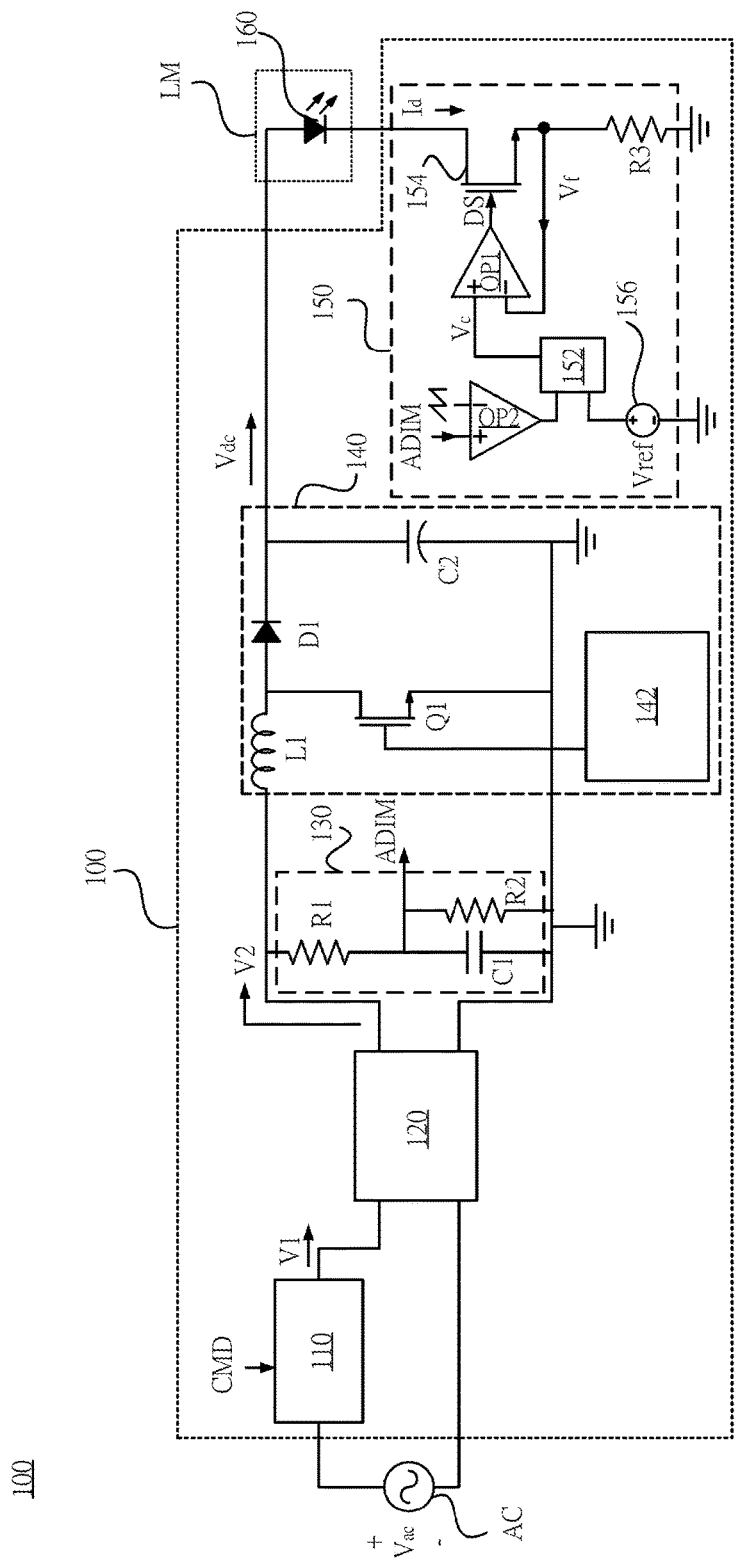
FIG. 3B is a diagram illustrating the lighting device according to some embodiments of the present disclosure.

Reference is made to FIG. 3B. FIG. 3B is a diagram illustrating the lighting device according to some embodiments of the present disclosure. With respect to the embodiments of FIG. 3A, like elements in FIG. 3B are designated with the same reference numbers for ease of understanding.

As illustrated in FIG. 3B, in some embodiments, the linear driving circuit 150 further includes a constant current control module and an analog dimming module. Specifically, the constant current control module may include a processing unit 152, a reference voltage source 156, and an operational amplifier OP1. The processing unit 152 may be configured to provide a voltage command $V_c$ to a first input terminal (e.g., a positive input terminal) of the operational amplifier OP1 according to the reference voltage $V_{ref}$ output by the reference voltage source 156. Thus, the operational amplifier OP1 may compare the error between the feedback voltage signal $V_f$ received by the second input terminal and the voltage command $V_c$, and output a driving signal DS with a dc level to control the driving unit 154 to in turn control the driving current $I_d$ to achieve the constant current function.

In addition, specifically, in some embodiments, the constant current control module may include the processing unit 152, and the operational amplifiers OP1 and OP2. After the linear driving circuit 150 receives the control voltage ADIM, the first input terminal (e.g., a positive input terminal) and the second input terminal (e.g., a negative input terminal) of the operational amplifier OP2 will respectively receive the control voltage ADIM and a reference signal (such as a sawtooth wave or a triangular wave), and the output terminal of the operational amplifier OP2 is electrically coupled to the processing unit 152. Thus, the operational amplifier OP2 may compare the control voltage ADIM with the sawtooth wave or the triangular wave, and output the control signal to the processing unit 152 via the output terminal of the operational amplifier OP2. Thus, the processing unit 152 may generate a corresponding pulse width modulation (PWM) wave according to the received control signal, and output the driving signal DS by the operational amplifier OP1, so as to control the amplitude of the driving current $I_d$.

Figure 4:
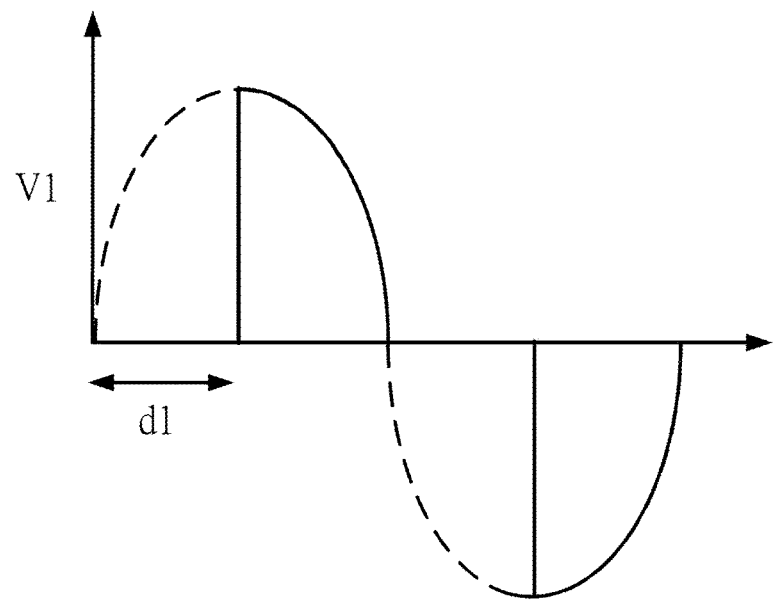
FIG. 4 and FIG. 5 are waveform diagrams illustrating voltage signals according to some embodiments of the present disclosure.
Figure 5:
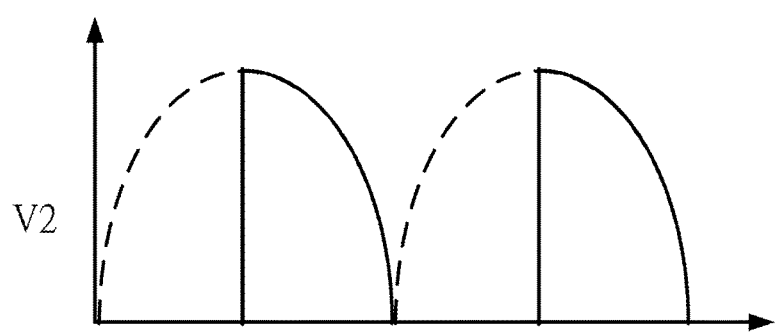

Reference is made to FIG. 4 and FIG. 5. FIG. 4 and FIG. 5 are waveform diagrams illustrating the voltage signals V1 and V2 respectively according to some embodiments of the present disclosure. For ease of explanation and a better understanding of the present disclosure, the voltage signals V1 and V2 in FIG. 4 and FIG. 5 are discussed in relation to the embodiments shown in FIG. 1, FIG. 3A and FIG. 3B, but are not limited thereto.

As shown in FIG. 4, the voltage signal V1 output by the triggering circuit 110 is obtained by applying a trigger delay to the ac input voltage $V_{ac}$ (as shown by the dotted line in the figure) received from the ac power source AC. Alternatively stated, in a trigger delay angle d1, the voltage signal V1 is zero. After the trigger delay angle d1, the voltage signal V1 has the same voltage waveform as the ac input voltage $V_{ac}$.

As shown in FIG. 5, after the voltage signal V1 is full-wave rectified by the rectifying circuit 120, the output voltage signal V2 is the upper half of the sinusoidal wave in each cycle, and has the same trigger delay angle d1 as the voltage signal V1 in each cycle. Thus, after the ac component of the voltage signal V2 is filtered by the capacitor C1, when the trigger delay angle d1 is large, the control voltage ADIM has a low voltage level. On the other hand, when the trigger delay angle d1 is small, the control voltage ADIM has a high voltage level.

Figure 6:
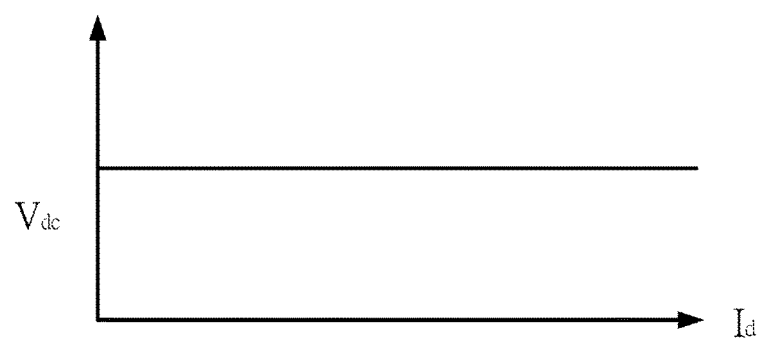
FIG. 6 is a characteristics diagram illustrating the relationship between a dc operating voltage and a driving current according to some embodiments of the present disclosure.

Reference is made to FIG. 6. FIG. 6 is a characteristics diagram illustrating the relationship between the dc operating voltage $V_{dc}$ and the driving current $I_d$ according to some embodiments of the present disclosure. For ease of explanation and a better understanding of the present disclosure, the dc operating voltage $V_{dc}$ in FIG. 6 is discussed in relation to the embodiments shown in FIG. 1, FIG. 3A and FIG. 3B, but is not limited thereto. As stated in the previous paragraphs, when the triggering circuit 110 changes the trigger delay angle according to the dimming command CMD, and further changes the amplitude of the driving current $I_d$ by the control voltage ADIM, the dc operating voltage $V_{dc}$ may be maintained at the same operating level and does not vary in response to changes in the control voltage ADIM or the driving current $I_d$.

Figure 7:
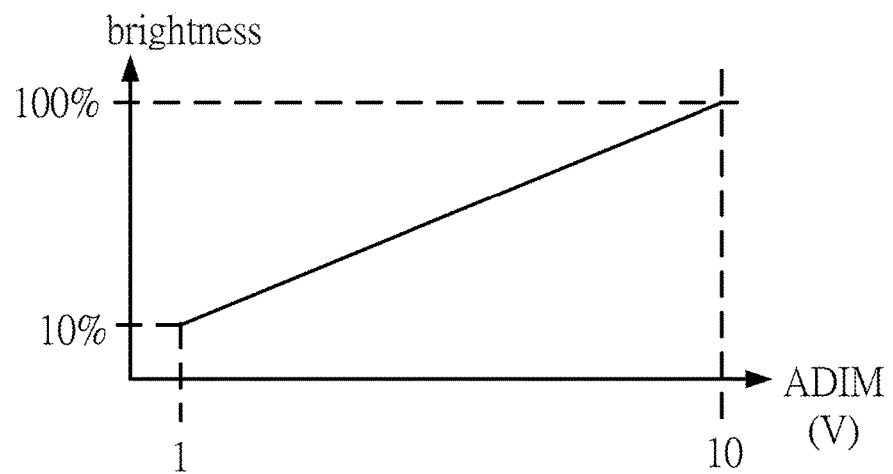
FIG. 7 and FIG. 8 are characteristics diagrams illustrating respectively the relationship between brightness of a light-emitting diode in a lighting module and a control voltage, and the relationship between the duty cycle of a driving signal and a control voltage according to some embodiments of the present disclosure.
Figure 8:
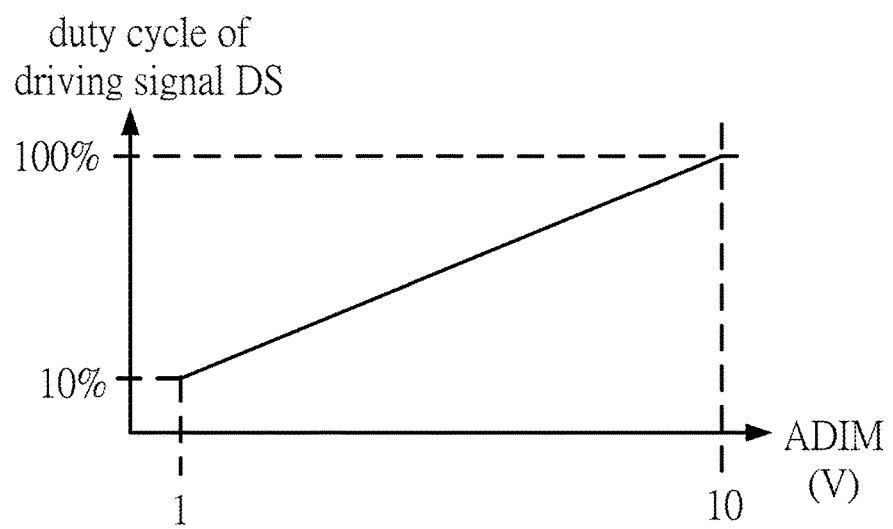

Reference is made to FIG. 7 and FIG. 8. FIG. 7 and FIG. 8 are characteristics diagrams illustrating respectively the relationship between the brightness of the light-emitting diode 160 in the lighting module LM and the control voltage ADIM, and the relationship between the duty cycle of the driving signal DS and the control voltage ADIM according to some embodiments of the present disclosure. For ease of explanation and a better understanding of the present disclosure, the driving signal DS and the control voltage ADIM in FIG. 7 and FIG. 8 are discussed in relation to the embodiments shown in FIG. 1, FIG. 3A and FIG. 3B, but are not limited thereto.

As shown in FIG. 7 and FIG. 8, in some embodiments, the control voltage ADIM may be operated between about 1 volt and about 10 volts. When the control voltage ADIM is about 1 volt, the duty cycle of the driving signal DS is about 10%, and when the control voltage ADIM is about 10 volts, the duty cycle of the driving signal DS is about 100%, such that these two values have a linear relationship with each other. Therefore, the driving current $I_d$ flowing through the light-emitting diode 160, and the brightness of the light-emitting diode 160 are also in a linear relationship with respect to the control voltage ADIM. Alternatively stated, when the control voltage ADIM is about 1 volt, the brightness of the light-emitting diode 160 is about 10%, and when the control voltage ADIM is about 10 volts, the brightness of the light-emitting diode 160 is about 100%. Accordingly, the linearity control of the brightness is achieved in the linear driving circuit 150.

Figure 9:
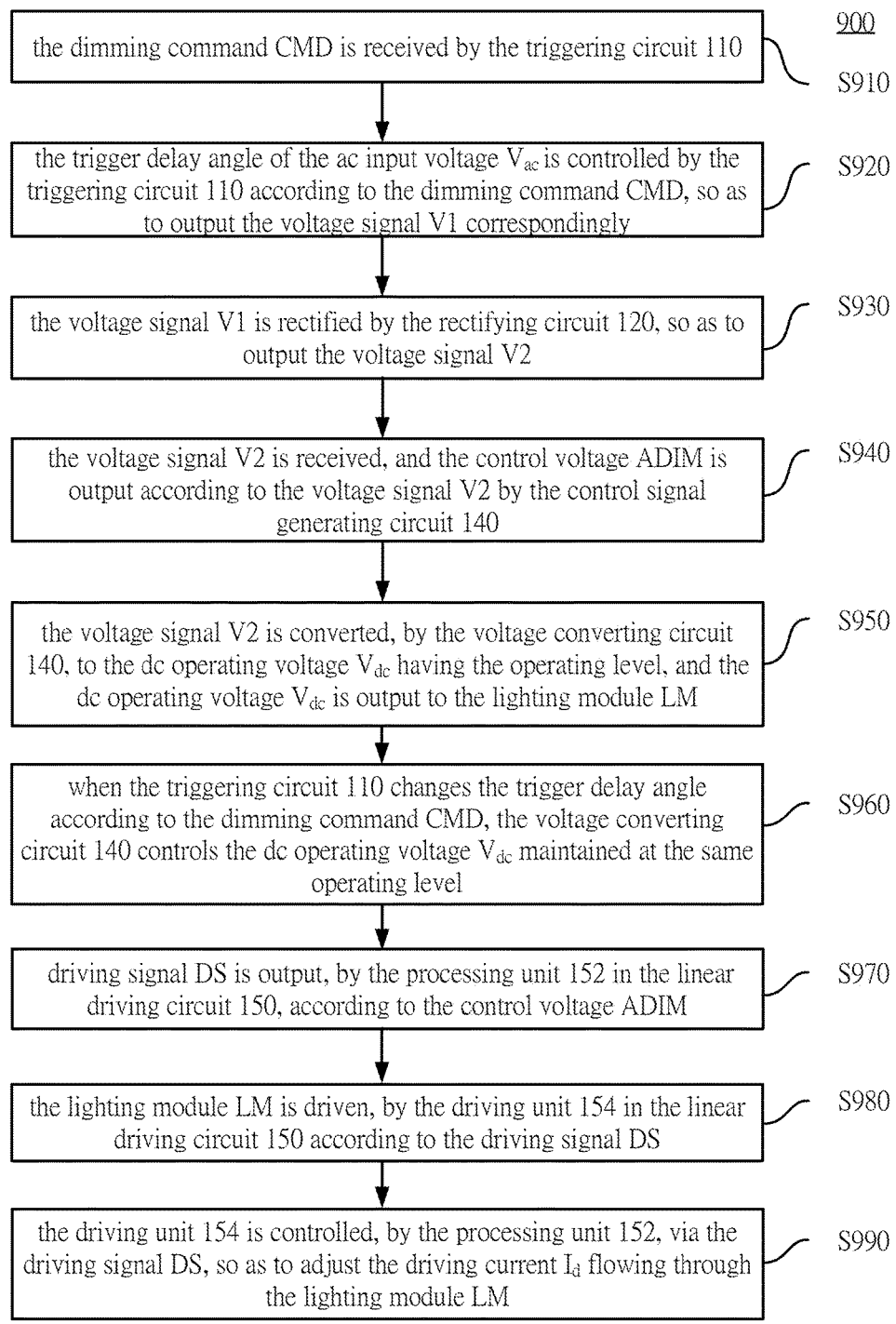
FIG. 9 is a flowchart illustrating a dimming method according to some embodiments of the present disclosure.

Reference is made to FIG. 9. FIG. 9 is a flowchart illustrating a dimming method 900 according to some embodiments of the present disclosure. For ease of explanation and a better understanding of the present disclosure, the dimming method 900 is discussed in relation to the dimming module 100, the lighting module LM, and the lighting devices 200a-200d shown in FIGS. 1-8, but is not limited thereto. It will be apparent to those skilled in the art that various modifications and variations can be made without departing from the scope or spirit of the disclosure. As shown in FIG. 9, the dimming method 900 includes steps S910, S920, S930, S940, S950, S960, S970, S980, and S990.

At first, in step S910, the dimming command CMD is received by the triggering circuit 110. Next, in step S920, the trigger delay angle of the ac input voltage $V_{ac}$ is controlled by the triggering circuit 110 according to the dimming command CMD, so as to output the voltage signal V1 correspondingly. Next, in step S930, the voltage signal V1 is rectified by the rectifying circuit 120, so as to output the voltage signal V2. Next, in step S940, the voltage signal V2 is received, and the control voltage ADIM is output according to the voltage signal V2 by the control signal generating circuit 140. Next, in step S950, the voltage signal V2 is converted by the voltage converting circuit 140 to the dc operating voltage $V_{dc}$ having the operating level, and the dc operating voltage $V_{dc}$ is output to the lighting module LM. Next, in step S960, when the triggering circuit 110 changes the trigger delay angle according to the dimming command CMD, the voltage converting circuit 140 controls the dc operating voltage $V_{dc}$ maintained at the same operating level.

Next, in steps S970-990, the lighting module LM is driven by the linear driving circuit 150 according to the control voltage ADIM. Specifically, in step S970, driving signal DS is output by the processing unit 152 in the linear driving circuit 150 according to the control voltage ADIM. In step S980, the lighting module LM is driven by the driving unit 154 in the linear driving circuit 150 according to the driving signal DS. In step S990, the driving unit 154 is controlled by the processing unit 152 via the driving signal DS, so as to adjust the driving current $I_d$ flowing through the lighting module LM.

Those skilled in the art will readily understand how to perform the operations and functions of the dimming method 900 based on the dimming module 100, the lighting module LM, and the lighting device 200a-200d in the embodiments described above, and thus a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

It is noted that the driving unit 154, the switch Q1, the operational amplifiers OP1, OP2, the rectifying circuit 120, and the light-emitting diodes in the lighting module LM in the aforementioned embodiments may be implemented in various ways. For example, the driving unit 154 and the switch Q1 may be implemented by bipolar junction transistors (BJTs), metal oxide semiconductor field effect transistors (MOSFETs), or other suitable semiconductor elements.

In summary, in the present disclosure, by applying the embodiments described above and integrating the voltage converting circuit 140 and the linear driving circuit 150 on the substrate 210, the flickering of the lighting module LM may be prevented when the user adjusts the brightness of the lighting module LM using an external dimming command CMD. In addition, by the power factor correction ability of the switching power supply in the voltage converting circuit 140, the power factor of the dimming module 100 may be increased, and the high efficiency of the voltage converting circuit 140 may also reduce the amount of waste heat generated by the lighting device. Hence, the difficulties associated with heat dissipation and the costs of the substrate are both reduced.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dimming module, comprising:
    a triggering circuit configured to control a trigger delay angle of an ac input voltage according to a dimming command, so as to output a first voltage signal correspondingly;
    a control signal generating circuit configured to output a control voltage according to the first voltage signal;

a voltage converting circuit configured to output a dc operating voltage having an operating level according to the first voltage signal, and output the dc operating voltage to a lighting module, wherein the lighting module comprises a light-emitting diode;

a linear driving circuit, configured to drive the lighting module according to the control voltage; and a rectifying circuit configured to rectify the first voltage signal, so as to output a second voltage signal;

wherein the control signal generating circuit is configured to receive the second voltage signal and output the control voltage according to the second voltage signal, and the control signal generating circuit comprises:

a first resistor, wherein a first terminal of the first resistor is configured to receive the second voltage signal;

a second resistor, wherein a first terminal of the second resistor is electrically coupled to a second terminal of the first resistor and a second terminal of the second resistor is electrically coupled to a around terminal; and a first capacitor, wherein a first terminal of the first capacitor is electrically coupled to the first terminal of the second resistor, and a second terminal of the first capacitor is electrically coupled to the second terminal of the second resistor.

2. The dimming module of claim 1, wherein the voltage converting circuit is configured to convert the second voltage signal to the dc operating voltage, and output the dc operating voltage to the lighting module.

3. The dimming module of claim 1, wherein when the triggering circuit changes the trigger delay angle according to the dimming command, the dc operating voltage is maintained at the same operating level.

4. The dimming module of claim 1, wherein the linear driving circuit comprises:

a processing unit configured to output a driving signal according to the control voltage; and a driving unit configured to drive the lighting module according to the driving signal.

5. The dimming module of claim 4, wherein the processing unit is configured to control the driving unit via the driving signal, so as to adjust a driving current flowing through the lighting module.

6. The dimming module of claim 5, wherein the driving unit comprises a driving switch, and a first terminal of the driving switch is electrically coupled to the lighting module, a second terminal of the driving switch is electrically coupled to a ground terminal, and a control terminal of the driving switch is configured to receive the driving signal, wherein the processing unit is configured to control the driving switch to be on or off selectively according to the driving signal.

7. The dimming module of claim 1, wherein the control voltage is at a first level when the trigger delay angle is at a first angle, and the control voltage is at a second level when the trigger delay angle is at a second angle, wherein the first angle is larger than the second angle, and the first level is smaller than the second level.

8. The dimming module of claim 1, wherein the voltage converting circuit comprises a switching power supply.

9. The dimming module of claim 1, wherein the linear driving circuit comprises:

a reference voltage source configured to output a reference voltage;

a processing unit configured to receive the reference voltage and output a voltage command according to the reference voltage;

a first operational amplifier configured to receive the voltage command and a feedback voltage signal to output a driving signal; and a driving unit configured to drive the lighting module according to the driving signal.

10. The dimming module of claim 9, wherein the linear driving circuit further comprises:

a second operational amplifier configured to output a control signal according to the control voltage and a reference signal;

wherein the processing unit is further configured to receive the control signal, and output the voltage command according to the control signal, so as to output the driving signal by the first operational amplifier.

11. A lighting device, comprising:

a substrate, a lighting module comprising a light-emitting diode located on the substrate;

a voltage converting circuit located on the substrate and configured to output a dc operating voltage having an operating level to the lighting module;

a linear driving circuit located on the substrate and configured to drive the lighting module according to a control voltage, so as to adjust a driving current flowing through the lighting module;

a triggering circuit located on the substrate and configured to correspondingly output a first voltage signal according to a dimming command;

a rectifying circuit located on the substrate and configured to rectify the first voltage signal, so as to output a second voltage signal; and a control signal generating circuit located on the substrate and configured receive the second voltage signal and output the control voltage according to the second voltage signal.

12. The lighting device of claim 11, wherein the linear driving circuit comprises:

a processing unit located on the substrate and configured to output a driving signal according to the control voltage; and a driving unit located on the substrate and configured to drive the lighting module according to the driving signal, wherein the processing unit is configured to control the driving unit via the driving signal, so as to adjust the driving current.

13. The lighting device of claim 12, wherein the driving unit comprises a driving switch, and a first terminal of the driving switch is electrically coupled to the lighting module, a second terminal of the driving switch is electrically coupled to a ground terminal, and a control terminal of the driving switch is configured to receive the driving signal, wherein the processing unit is configured to control the driving switch to be on or off selectively according to the driving signal.

14. The lighting device of claim 11, wherein the voltage converting circuit is configured to convert the second voltage signal to the dc operating voltage, and when the triggering circuit changes the first voltage signal according to the dimming command, the voltage converting circuit controls the dc operating voltage maintained at the same operating level.

15. The lighting device of claim 11, wherein the control signal generating circuit comprises:

a first resistor, wherein a first terminal of the first resistor is configured to receive the second voltage signal;

a second resistor, wherein a first terminal of the second resistor is electrically coupled to a second terminal of the first resistor, and a second terminal of the second resistor is electrically coupled to a ground terminal; and a first capacitor, wherein a first terminal of the first capacitor is electrically coupled to the first terminal of the second resistor, and a second terminal of the first capacitor is electrically coupled to the second terminal of the second resistor.

16. The lighting device of claim 11, wherein the voltage converting circuit comprises a switching power supply.

17. The lighting device of claim 11, wherein the linear driving circuit comprises:

a reference voltage source configured to output a reference voltage;

a processing unit configured to receive the reference voltage and output a voltage command according to the reference voltage;

a first operational amplifier configured to receive the voltage command and a feedback voltage signal to output a driving signal; and a driving unit configured to drive the lighting module according to the driving signal.

18. The lighting device of claim 17, wherein the linear driving circuit further comprises:

a second operational amplifier configured to output a control signal according to the control voltage and a reference signal;

wherein the processing unit is further configured to receive the control signal, and output the voltage command according to the control signal, so as to output the driving signal by the first operational amplifier.

* * * * *